United States Patent
Kubo et al.

(10) Patent No.: US 6,471,795 B2
(45) Date of Patent: Oct. 29, 2002

(54) METHOD OF PRODUCING HYDROGEN STORAGE ALLOYS

(75) Inventors: Kazuya Kubo, Hokkaido (JP); Toshiki Kabutomori, Tokyo (JP); Hideaki Itoh, Hokkaido (JP)

(73) Assignee: The Japan Steel Works Ltd., Tokyo (JP)

( * ) Notice: Subject to any disclaimer, the term of this patent is extended or adjusted under 35 U.S.C. 154(b) by 0 days.

(21) Appl. No.: 09/789,675

(22) Filed: Feb. 22, 2001

(65) Prior Publication Data

US 2001/0045247 A1 Nov. 29, 2001

(30) Foreign Application Priority Data

Feb. 22, 2000 (JP) ....................... 2000-044174

(51) Int. Cl.$^7$ ................................. C21D 1/00
(52) U.S. Cl. ...................................... 148/538
(58) Field of Search ................... 148/538; 420/434, 420/585, 586, 586.1, 587, 580, 582, 583, 584, 584.1

(56) References Cited

U.S. PATENT DOCUMENTS

| 4,412,982 A | * | 11/1983 | Wallace et al. | ............. 420/422 |
| 4,457,891 A | * | 7/1984 | Bernauer et al. | ........... 420/434 |
| 5,753,054 A | * | 5/1998 | Tsuji et al. | ................. 148/421 |
| 5,817,222 A | * | 10/1998 | Kaneko | ....................... 148/403 |

FOREIGN PATENT DOCUMENTS

| DE | 32 10 381 C1 | 5/1983 | |
| DE | 696 01 321 T2 | 6/1999 | |
| JP | 10195569 A | * 7/1998 | ........... C22C/22/00 |
| JP | 10195580 A | * 7/1998 | ........... C22C/22/00 |
| JP | 10195584 A | * 7/1998 | ........... C22C/22/00 |

* cited by examiner

*Primary Examiner*—Roy King
*Assistant Examiner*—Tima McGuthry-Banks
(74) *Attorney, Agent, or Firm*—Sughrue Mion, PLLC

(57) ABSTRACT

A hydrogen storage alloy of $Ti_aMn_bV_cZr_d$ (one of two kinds or more of Fe, Co, Cu, Zn, Ca, Al, Mo and Ni)$_x$ (herein, a is 10 to 40 atomic %, b is 40 to 60 atomic %, c is 5 to 30 atomic %, d is 15 atomic % or less, and x is 0 to 10 atomic %) is obtained by the rapid solidification (solidification at the cooling rate of desirably $10^{3°}$ C./sec or higher).

12 Claims, 2 Drawing Sheets

COMPARISON OF PCT BETWEEN ORDINARILY HEAT TREATED MATERIAL AND RAPIDLY SOLIDIFIED MATERIAL

COMPARISON OF PCT BETWEEN ORDINARILY HEAT
TREATED MATERIAL AND RAPIDLY SOLIDIFIED MATERIAL

COMPARISON OF PCT BETWEEN ORDINARILY HEAT
TREATED MATERIAL AND RAPIDLY SOLIDIFIED MATERIAL

METHOD OF PRODUCING HYDROGEN STORAGE ALLOYS

BACKGROUND OF INVENTION

1. Field of Invention

The present invention relates a method of producing hydrogen storage alloy to be served in such as material for hydrogen storage and supply, material of absorbing hydrogen for heat exchange, material for supplying hydrogen for fuel cell, material for negative electrode for Ni-hydrogen cell, material for refining and recovering hydrogen, or material of absorbing hydrogen for hydrogen gas actuator.

2. Related Art

Conventionally, there has been a compressed gas system or liquid hydrogen system as an instrument for storing and transporting hydrogen, and now in place of these practices, a system using hydrogen storage alloy has been noticed. As known, the hydrogen storage alloy has a property reversely reacting with hydrogen, absorbing and desorbing hydrogen simultaneously with "in and out" of heat of reaction. It has been attempted to proceed to practice a technique making use of this chemical reaction for storing and transporting hydrogen, and it has been progressing to develop and practice a technique utilizing heat of reaction for structuring the heat storing and transporting system. Aiming to practicing these attempts, many kinds of hydrogen storage alloys have been developed, and representative hydrogen storage alloys are knows as $LaNi_5$, TiFe, or $TiMn_{1.5}$.

Incidentally, for proceeding various kind of usage to practice, it is necessary to more improve characteristics of materials for storing hydrogen, and big problems involved are to increase an amount of storing hydrogen, cost down raw materials, and improve a plateau property or durability endurance.

Among the above mentioned representative hydrogen storage alloys, TiMn based alloy is large in a maximum amount of occluding hydrogen and preferable in the plateau property, and being very excellent in endurance depending on a composition, it is one alloy system of this kind expected toward practicing. However, also in this alloy, since a plateau and hysteresis factor is large and rechargeable hydrogen capacity is small, a sufficient performance cannot be effected when practicing, and it is therefore difficult to apply this alloy to a severe system in a pressure range such as a heat pump. There has been known a method of reducing an α phase area at an initial hydrogenation by replacing a part of Ti with V so as to increase rechargeable hydrogen capacity, but it has not yet reached a practicing level. JP-A-7-102339 proposes an alloy where one part of Ti of TiMnV based alloy is replaced with Zr, thereby to increase the maximum amount of absorbing hydrogen while reducing a soluble area, and largely increase rechargeable hydrogen capacity. However, since the substitution of Zr increases a slope of the plateau as substituting the amount of Zr, such a proposed alloy cannot be applied as it is to the system, and a very small amount of adding Zr is possible (1.7% in terms of the ratio of the atomic amount).

SUMMARY OF INVENTION

The invention has been realized in view of the above mentioned circumstances, and it is an object of the invention to provide a method of a practical hydrogen storage alloy which enables to effectively absorb and release hydrogen at room temperatures, shows an excellent maximum hydrogen capacity and rechargeable hydrogen capacity in comparison with conventional materials, exhibits a superior plateau and hysteresis property, and has an excellent characteristic especially near the room temperatures.

For solving the above mentioned problems, a first invention of the method of producing the hydrogen storage alloy, which is expressed with a formula of $Ti_aMn_bV_cZr_dA_eB_fC_gNi_h$, a crystal structure of which comprises a hexagonal close-packed structure, characterized in that a molten raw material is rapidly solidified for obtaining the hydrogen storage alloy, herein, a is 10 to 40 atomic %, b is 40 to 60 atomic %, c is 5 to 30 atomic %, d is 15 atomic % or less, e, f, g, h, e+f+g+h are 0 to 10 atomic %, A: one or two kinds of Fe and Co B: one or two kinds or more of Cu, Zn and Ca C: one or two kinds of Al and Mo.

A second invention of the method of producing the hydrogen storage alloy as set forth in the first invention is characterized in that the molten raw material is rapidly solidified to be a final alloy without carrying out a homogenization treatment.

A third invention of the method of producing the hydrogen storage alloy as set forth in the first or second invention is characterized in that a cooling rate at a rapid solidification is $10^{3°}$ C./sec or higher.

DETAILED DESCRIPTION OF PREFERRED EMBODIMENTS

Principle of Invention

Figure 1:
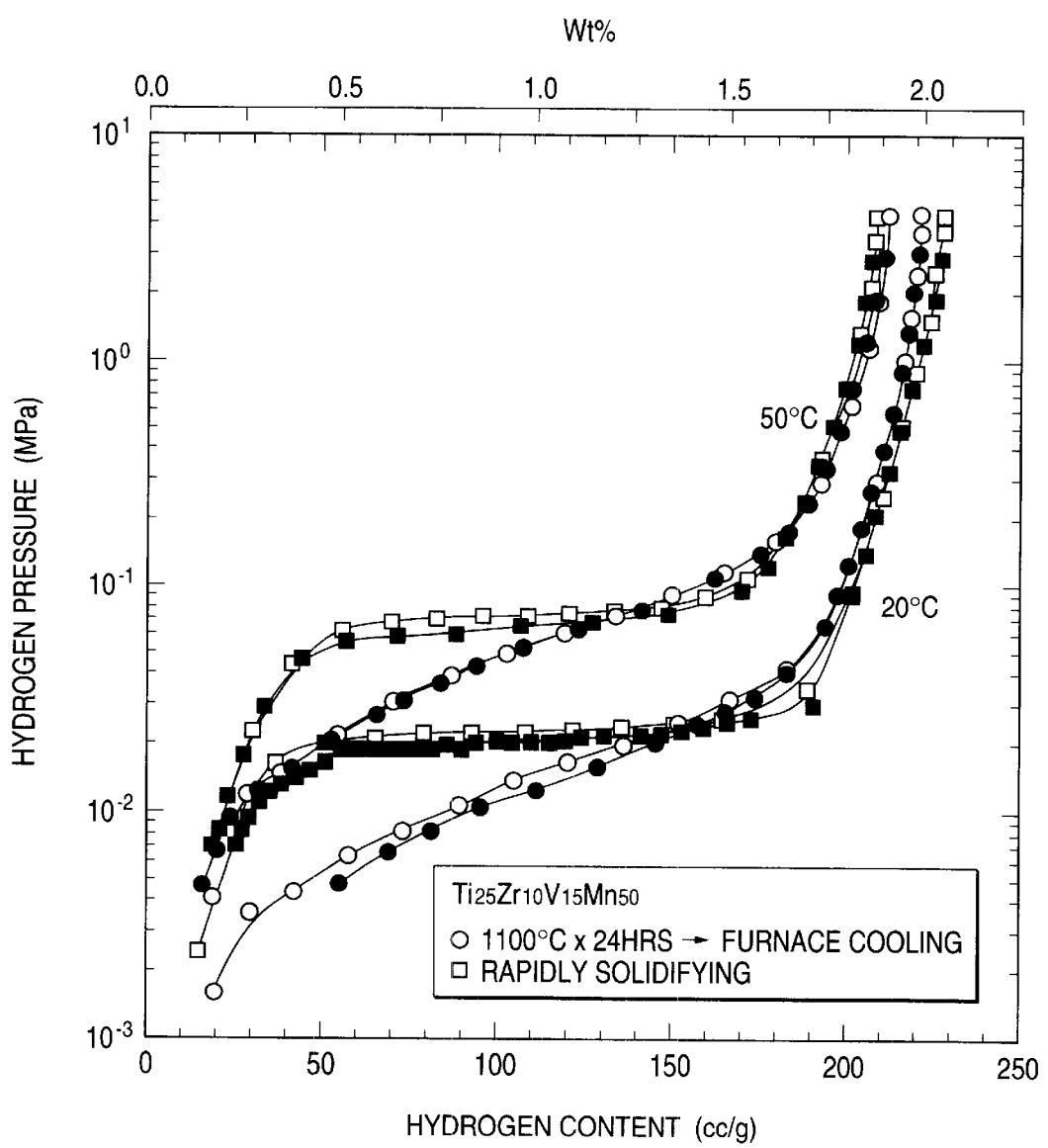
FIG. 1 is a graph showing the hydrogen pressure-composition isothermal curve in the process of absorbing and releasing hydrogen with respect to the test samples in the Example of the invention.

Explanation will be made as follows to the reasons for defining components and cooling conditions of the invention.

Ti: 10 to 40 Atomic %

Mn: 40 to 60 Atomic %

Ti and Mn are basic elements for composing Ti-Mn based hydrogen storage alloy of hexagonal close-packed structure, and for providing the fundamental characteristics as said based alloy, the respective ratios of the amounts within the above mentioned ranges are necessary.

V: 5 to 30 Atomic %

V reduces the α phase area at the initial hydrogenation and increases rechargeable hydrogen capacity. So, the ratio of the amount of 5 atomic % or more is necessary. On the other hand, exceeding 30 atomic %, a plateau width becomes narrow to lower the plateau characteristics, and the upper limit is defined to be 30 atomic %. For the same reasons, it is desirable to set the lower limit to be 13 atomic % and the upper limit to be 20 atomic %.

Zr: 15 Atomic % or Less

Zr is contained for increasing rechargeable hydrogen capacity. On the other hand, the Zr addition decreases an equilibrium hydrogen pressure and worsens the plateau+hysteresis characteristic. But, since the invention produces the hydrogen storage alloy through a later mentioned rapid solidification, the above mentioned inconveniences by Zr can be largely decreased, so that Zr may be more added than in the existing materials. But, although depending on this procedure, and if containing Zr exceedingly, said inconveniences are remarkable. Therefore, the upper limit is defined to be 15 atomic %. For securely providing good performance of Zr, it is preferable to contain 2 atomic % or more and to define the upper limit to be 10 atomic % for the same reason as mentioned above.

A Group (One or Two Kinds of Fe and Co): 0 to 10 Atomic %

Fe and Co are effective for changing the equilibrium pressure and increasing rechargeable hydrogen capacity at room temperatures, and are, if needed, added as elements for adjusting the equilibrium pressure. If adding more than 10 atomic %, such addition has bad influences on the characteristics of alloy such as considerably decreasing the maximum amount of hydrogen absorption, remarkably lowering rechargeable hydrogen capacity by increasing of the α phase area, or increasing the slope of the plateau. Thus, the upper limit is determined to be 10 atomic %.

It is preferable to define the lower limit to be 4 atomic % and the upper limit to be 6 atomic % for the same reason. B group (one or two kinds or more of Cu, Zn and Ca):

0 to 10 atomic %

Cu, Zn and Ca work as elements for improving the plateau property, and one kind or more of them are added as requested. Being more than 10 atomic %, bad influences are affected to the characteristics of the alloy similarly to the A group, and the upper limit be 10 atomic %.

For the same reasons, it is preferable to define the lower limit to be 1 atomic % and the upper limit to be 3 atomic %. C group (one or two kinds of Al and Mo): 0 to 10 atomic %.

Al and Mo are elements for increasing lattice constants, and, if required, are added as the elements for increasing the maximum amount of hydrogen absorption with fine amounts. An alloy with Zn addition can, as molten, obtain an equivalent plateau property to that of a heat treated material. Being more than 10 atomic %, bad influences are caused to the characteristics of the alloy similarly to the A group, and the upper limit is thus 10 atomic %.

For the same reasons, it is preferable to define the lower limit to be 3 atomic % and the upper limit to be 5 atomic %. Ni: 0 to 10 Atomic %

Ni is added as, if required, an element for durabilitying a reactivity. Being more than 10 atomic %, bad influences are affected to the characteristics of the alloy similarly to the A group, and the upper limit be 10 atomic %.

For the same reasons, it is preferable to define the lower limit to be 2 atomic % and the upper limit to be 6 atomic %.

Although the amounts of A, B, C groups and Ni are individually at the above mentioned upper limit or less, the total amount thereof should be also 10 atomic % or less for the same reasons as the individual cases.

Rapid solidification (cooling rate; $10^{3°}$ C./sec or more)

According to the invention, it is possible to effectively absorb or release the hydrogen in various temperature ranges by works of the composing components of Ti, Mn, V and Zr. Besides, the plateau +hysteresis characteristics are largely improved by making an ingot through a rapid solidification such as a roll rapid cooling to durability the hydrogen storing and transporting efficiency. A cooling at making alloy ingots in prior making methods depended on an air cooling or a water cooling, and the cooling rate was around $10^{2°}$ C./sec at the most. The invention obtains the above mentioned works by the rapid solidification at the cooling rate exceeding $10^{2°}$ C./sec. But, $10^{3°}$ C./sec or more is desirable.

Generally, in Ti—Zr—Mn—V based alloy, the Zr addition amount brings about effects such as decreasing of the equilibrium hydrogen pressure or increasing of the moving amount of the available hydrogen, but causes a bad influence as increasing of the slope of the plateau. According to inventors' studies, it has been found that a big cause of increasing the slope of the plateau is a segregation of Zr in the alloy. Ordinarily, for the hydrogen storage alloy, an alloy is heated to high temperatures as a heat treatment, followed by a cooling homogenization, but although the heat treating temperature is changed to a degree (for example, around 1000° C.) at which the alloy is not melted, the segregation of Zr is not improved. Even if the cooling rate from the heating treatment is changed from an ordinary furnace cooling to the water cooling (the cooling rate is about $10^{2°}$ C./sec), the Zr segregation is not yet improved but the slope of the plateau is kept large as it is. Then, in the invention, for suppressing the segregation taking place when solidifying, the rapidly cooling solidification which is originally used to produce an amorphous alloy, is utilized to cool at a high rate so as to change homogenization of alloying components, so that the slope of plateau has been improved. For providing this performance, the cooling rate of $10^{3°}$ C./sec or more is desirable. The selection of components is paid attention to for effectively providing the effects of the rapidly cooling solidification and improving the alloy characteristics.

The above mentioned methods of the rapidly cooling solidification are not especially limited, but various methods may be selected for providing the above cooling rates, for example, a gas atomizing method, a centrifugal method, a roll rapidly cooling method, and others may be employed.

In the roll rapidly cooling method among the rapid solidification methods, the hydrogen storage alloy solidified in thin piece can be obtained by adjusting the roll rotation speed, the hole diameter of the nozzle, the Ar jetting pressure, and the gap between the roll and the nozzle. This alloy is uniformly cooled, improving the homogeneity of the alloying components. In a conventional production procedure, alloys are ordinarily pulverized into powder, and cost for the procedure and a problem-of yield were taken as themes, but according to the above mentioned rapidly solidification method, the hydrogen storage alloy can be made the thin piece, so that the pulverizing operation can be easily carried out and powder of the hydrogen storage alloy can be efficiently obtained.

Preferred Embodiments

In the invention, the raw materials of the respective components such as Ti, Zr, V and Mn are weighed to be the atomic ratios specified by the invention, and melted by an ordinary method so as to obtain the hydrogen storage alloy by the rapid solidification such as the roll rapidly solidifying method.

In the prior art, the hydrogen storage alloy is melted, followed by the homogenizing treatment for uniformalizing the components by heating the alloy to high temperatures, but in the invention, the sufficient homogenizing effect is provided by the above mentioned rapid solidification, and a final alloy can be provided omitting the homogenizing treatment as practiced conventionally. The final alloy is meant by such an alloy to be used to an aiming application not subjected to a subsequent heat treatment.

The obtained hydrogen storage alloy is pulverized by a mechanical method if required as mentioned above to be powder of the hydrogen storage alloy. The pulverizing method is not especially limited, but may depend on a known convenient method.

The hydrogen storage alloy is, if powder, used as it is, or shaped for desired usage. Applications of the hydrogen storage alloy obtained by the invention are not restricted, and the hydrogen storage alloy may be used to various kinds of uses making use of hydrogen absorbing and releasing phenomena, and for example, to such usage of heat pipes of a thermal transporting system, a freezing system or a hydrogen storing system. In these systems, the efficiency of the system may be largely increased by using the hydrogen storage alloy obtained by the invention.

EXAMPLE

Raw materials were mixed to be the compositions shown in Table 1, the mixed material was received in a high frequency melting crucible installed in the rapidly solidifying apparatus of a copper single water cooling roll system, the alloying raw materials mixed to be an aimed composition in the crucible was high-frequency melted, and then the alloy was rapidly solidified through the Cu single roll method. The cooling rate at that time was confirmed to be $10^{5\circ}$ C./sec. The obtained alloy was shaped in thin piece, was not broken and made a measuring test sample as shaped. For comparison, the raw material was similarly mixed with the composition shown in Table 1, melted by an ordinary method, and solidified leaving in the air. Subsequently, the obtained alloy ingot was heated at 1100° C. for 24 hours, subjected to the homogenizing treatment by the furnace cooling, and mechanically pulverized to be measuring test sample.

Respective test samples of 5 g were enclosed in a reacting container made of stainless steel within a metal hydride making apparatus of high pressure method. An activation treatment was carried out as a pre-treatment for measuring the hydrogen absorbing and releasing characteristics. That is, the interior of the reacting container was degassed by heating at 400° C. for two hours as pressure-reducing (around 1.3 Pa) and air-exhausting, then introduced with highly purified hydrogen of 4.9 MPa pressure at the same temperature, and cooled to 20° C. By the treatment, the test samples instantly started to absorb hydrogen and after 30 minutes, the absorption of hydrogen was accomplished. Further, the gas was exhausted as heating the container to 400° C. to release hydrogen from the test samples. By repeating the treatment several times, the activating treatment was finished.

The hydrogen absorbing and desorbing characteristic of each sample was measured. Namely, after the temperature of the container was cooled down to 20° C. and held, the hydrogen of high purity of a predetermined amount was introduced into the container. The hydrogen was absorbed into the samples and the pressure within the container was stabilized, and then the amount of the hydrogen absorbed in the sample was demanded by the hydrogen pressure in the container and a constant volumetric method. The hydrogen of the predetermined amount was again introduced into the container, and after stabilizing the pressure, the hydrogen pressure and the hydrogen storage amount were demanded. The following operation was repeated until the pressure in the container being 4.9 MPa so as to demand the hydrogen pressure-composition-isothermal curve.

Figure 2:
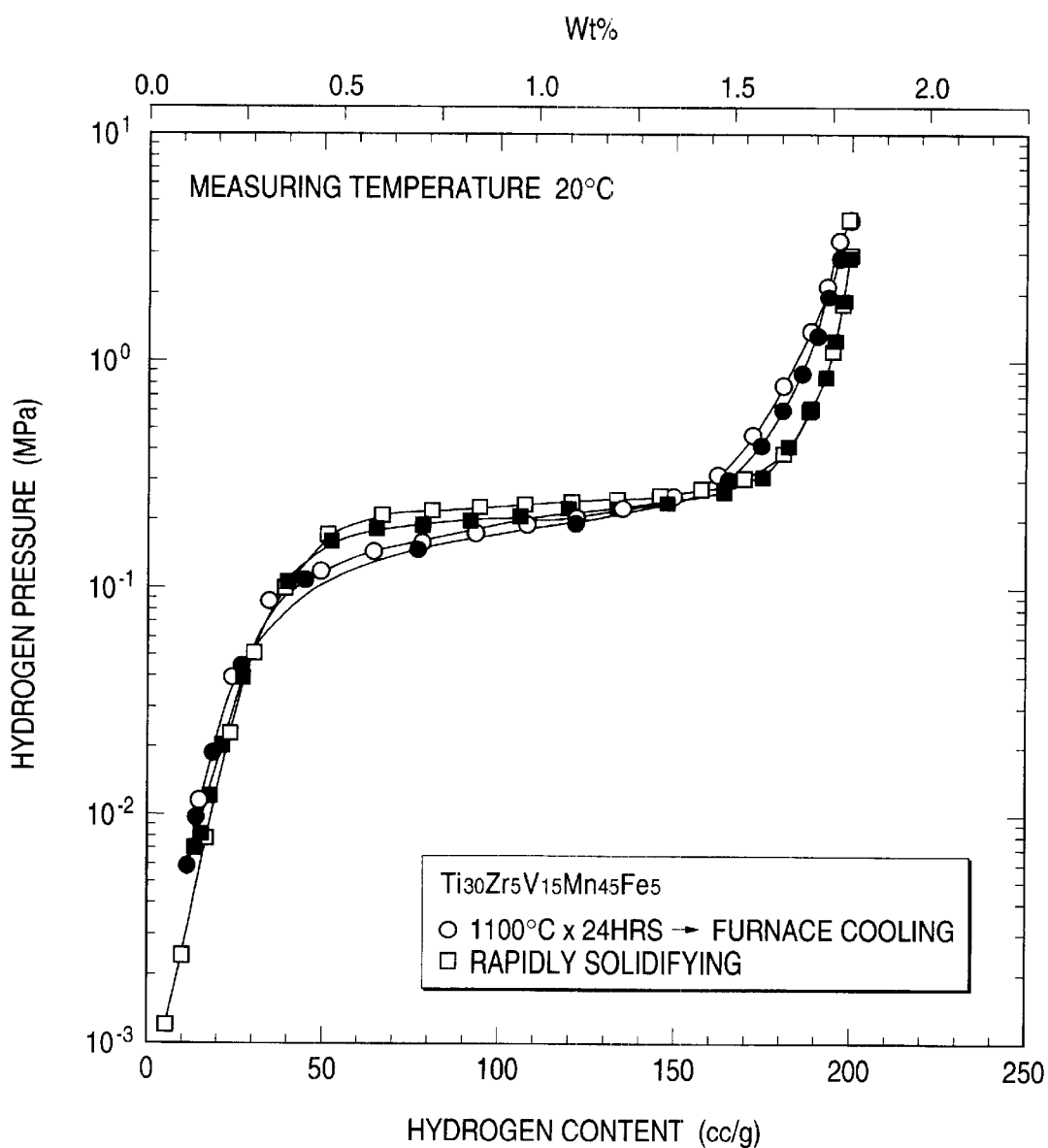
FIG. 2 is a graph showing the hydrogen pressure-composition isothermal curve in the process of releasing hydrogen with respect to the other test samples.

As mentioned above, the hydrogen was occluded in each sample until the pressure of 4.9 MPa and the hydrogen of the predetermined amount was exhausted from the container as holding the reacting container at 20° C. After the hydrogen pressure in the container was stabilized, the hydrogen amount was demanded by use of the pressure in the container and the constant volumetric method. The hydrogen of the predetermined amount was again exhausted from the reacting container. The following operation was repeated until the pressure in the container being 20 kPa so as to demand the hydrogen pressure-composition-isothermal curve. FIGS. 1 and 2 show the graphs expressing the curves as to parts of the test samples.

The plateau property was evaluated by the slope of the curve at the plateau center on the pressure-composition-isothermal curve. Specifically, $Ln(P_{ab}/P_{de})$ was made the evaluating values of the plateau property, and the values are shown in Table 1. Herein, $P_{ab}$ is the hydrogen pressure at the high storage side of the plateau when absorbing the hydrogen, and $P_{de}$ is the hydrogen pressure at the low storage side of the plateau when releasing the hydrogen.

TABLE 1

| Samples No. | Composition of alloys | Maximum hydrogen capacity (cc/g) | Rechargeable hydrogen capacity (cc/g) | Plateau Property |
|---|---|---|---|---|
| Inv. | | | | |
| 1 | $Ti_{30}Zr_5V_{15}Mn_{50}$ | 220 | 150 | 0.4 |
| 2 | $Ti_{25}Zr_{10}V_{15}Mn_{50}$ | 227 | 160 | 0.5 |
| 3 | $Ti_{30}Zr_5V_{15}Mn_{45}Fe_5$ | 200 | 120 | 0.7 |
| Com. | | | | |
| 4 | $Ti_{30}Zr_5V_{15}Mn_{50}$ | 220 | 150 | 1.2 |
| 5 | $Ti_{25}Zr_{10}V_{15}Mn_{50}$ | 227 | 160 | 2.7 |
| 6 | $Ti_{30}Zr_5V_{15}Mn_{45}Fe_5$ | 200 | 120 | 1.1 |

Inv.: Inventive Materials Com.: Comparative Materials

As is apparent from Table 1, comparing with the comparative materials produced by the prior art, the inventive materials show the remarkably improved plateau properties though the maximum hydrogen capacity and the rechargeable hydrogen capacity are equivalent to those of materials of the prior art.

As discussed above, according to the production method of the hydrogen storage alloy of the invention, the alloy of TiMnZr group of the specific components of the hexagonal close-packed structure is obtained by the rapid solidification (solidification at the cooling rate of desirably $10^{3\circ}$ C./sec or more) so that the components are effectively homogenized, enabling to remarkably improve the plateau property and the hysteresis characteristic without changing the rechargeable hydrogen capacity and the maximum amount of hydrogen storage, and thus it is possible to obtain the hydrogen storage alloy having the practical excellence.

What is claimed is:

1. A method of producing hydrogen storage alloy expressed with a formula of $Ti_aMn_bV_cZr_dA_eB_fC_gNi_h$, and having a crystal structure comprising a hexagonal close-packed structure, comprising the steps of:

rapidly solidifying a molten raw material for obtaining the hydrogen storage alloy, wherein a cooling rate for rapid solidification is greater than $10^{2\circ}$ C./sec, wherein a is 10 to 40 atomic %, b is 40 to 60 atomic %, c is 5 to 30 atomic %, d is 15 atomic % or less, e, f, g, and h are such that e+f+g+h are 0 to 10 atomic %, A: one or two kinds of Fe and Co B: one or two kinds or more of Cu, Zn and Ca, and C: one or two kinds of Al and Mo.

2. The method of producing hydrogen storage alloy as set forth in claim 1, wherein the molten raw material is rapidly solidified to be a final alloy without carrying out a homogenization treatment thereon.

3. The method of producing hydrogen storage alloy as set forth in claim 1, wherein a cooling rate for rapid solidification is $10^{3\circ}$ C./sec or higher.

4. The method of producing hydrogen storage alloy as set forth in claim 2, wherein a cooling rate for rapid solidification is $10^{3°}$ C./sec or higher.

5. The method of producing hydrogen storage alloy as set forth in claim 1, wherein d is 2 to 15 atomic %.

6. The method of producing hydrogen storage alloy as set forth in claim 5, wherein the molten raw material is rapidly solidified to be a final alloy without carrying out a homogenization treatment thereon.

7. The method of producing hydrogen storage alloy as set forth in claim 5, wherein a cooling rate for rapid solidification is $10^{3°}$ C./sec or higher.

8. The method of producing hydrogen storage alloy as set forth in claim 6, wherein a cooling rate for rapid solidification is $10^{3°}$ C./sec or higher.

9. The method of producing hydrogen storage alloy as set forth in claim 1, wherein d is 2 to 10 atomic %.

10. The method of producing hydrogen storage alloy as set forth in claim 9, wherein the molten raw material is rapidly solidified to be a final alloy without carrying out a homogenization treatment thereon.

11. The method of producing hydrogen storage alloy as set forth in claim 9, wherein a cooling rate for rapid solidification is $10^{3°}$ C./sec or higher.

12. The method of producing hydrogen storage alloy as set forth in claim 10, wherein a cooling rate for rapid solidification if $10^{3°}$ C./sec or higher.

* * * * *